May 3, 1932.  M. A. AMOR  1,857,009
EDUCATIONAL APPLIANCE
Filed Aug. 2, 1930
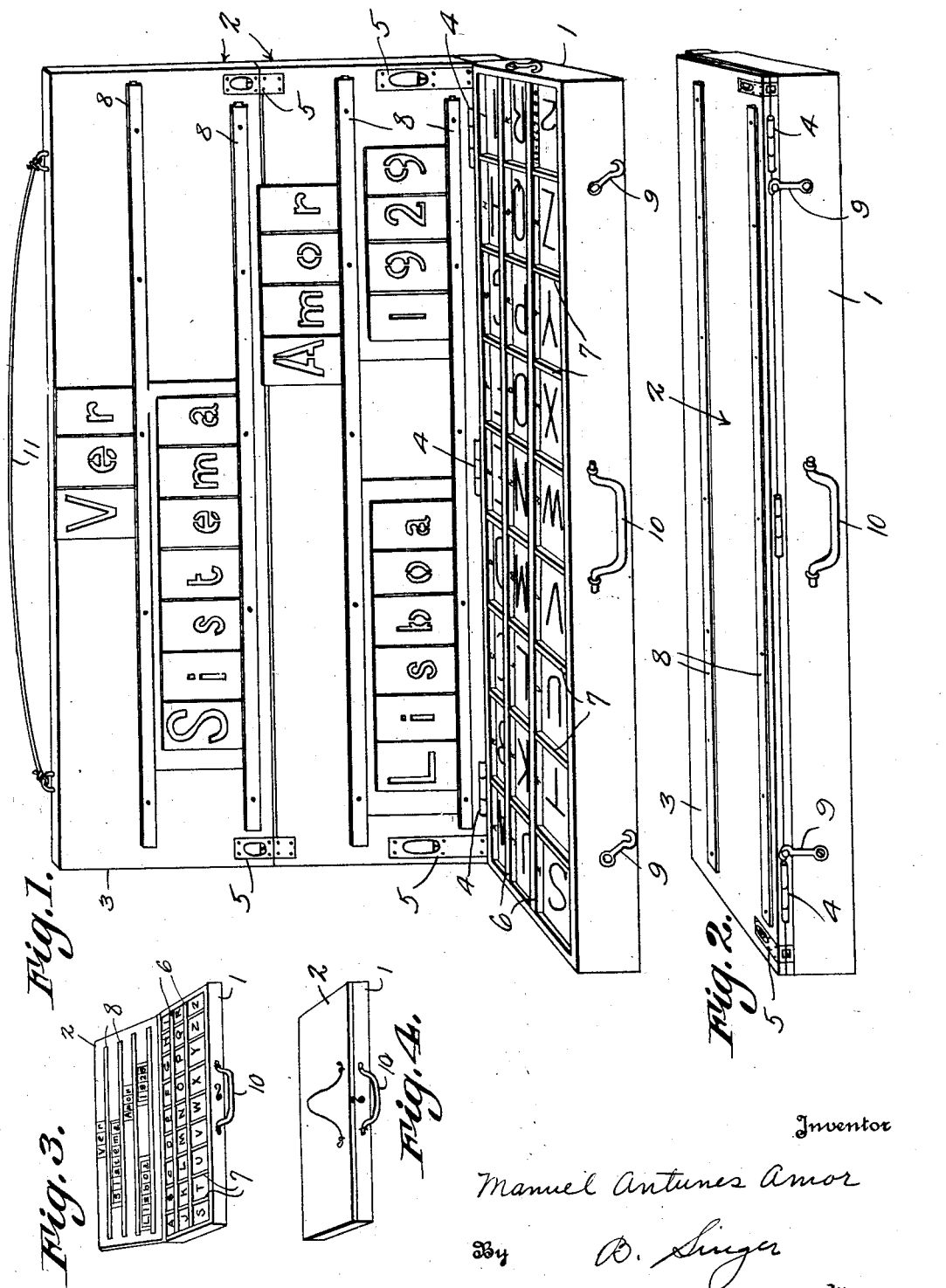
Inventor
Manuel Antunes Amor
By O. Singer
Attorney Patented May 3, 1932

1,857,009

UNITED STATES PATENT OFFICE

MANUEL ANTUNES AMOR, OF LISBON, PORTUGAL

EDUCATIONAL APPLIANCE

Application filed August 2, 1930. Serial No. 472,696.

This invention relates to an educational appliance intended for use in infant and primary schools and in the teaching of the rudiments of reading and writing, simultaneously.

According to the invention a receptacle is provided whose lid or cover is adapted so that it may be raised into an upright or angular position and provided for the application in series of letters or figures in particular styles of printing or writing for spelling out and writing words or phrases or for use in arithmetical exercises, while the receptacle itself is adapted by the provision of compartments for the reception of sets of individual letters of the alphabet or of figures in various styles, formed as stencils on blanks of metal, celluloid, or card or other suitable material. The lid is accordingly provided with means for sliding the individual stencilled letters, figures or blanks of square, rectangular or other convenient shape in position to form words or phrases or for arithmetical exercises, the means employed conveniently consisting of a number of series of parallel and horizontal bars secured to the inner face of the lid and having their edges rabbeted or otherwise formed with grooves so that the lower edges of the blanks bearing the stencilled letters or figures, or sheets of paper, may be passed between the bars or within grooves provided in the bars, for the purpose of instruction.

According to the invention, moreover, in the use of letters in the form of stencils, means may be provided whereby the form of the letters, figures or the like may be traced, painted or otherwise formed upon a surface against which the stencils are applied. For this purpose strips of slate or other material suitable for reception of the copied letters, figures or the like, such as slate, paper or cardboard, may be provided to be applied upon the lid behind the stencils, or the lid itself may be provided of a material suitable for the purpose or with an inset tablet or tablets of a suitable material.

The cover or lid of the receptacle may be adapted, as, for example, by an extension at the rear edge, whereby the cover or lid may assume a right angle or an obtuse angle with respect to the receptacle, and the lid may be suitably hinged to the receptacle and may be provided in a number of parts, so that one part may be hinged to the other, so that the parts may be brought either into the same plane and locked together to form a single surface for the reception of the blanks or into parallel relation one upon the other and both to be disposed over the receptacle to close it, and suitable fastening means may be provided, such for example as pivoted hooks and pins.

A large model of the appliance may be provided for the use of the teacher and may be of such a size that the letters and figures exhibited thereon may be readily seen by the pupils, while a smaller model otherwise substantially the same as the larger may be provided for the use of the pupils, so that thus the pupils may be able to spell out and to write simultaneously, words or phrases as indicated on the larger model used by the teacher for demonstrations simultaneously.

The invention comprises the features hereinafter described and as illustrated in the accompanying drawings, in which Figure 1 is a perspective view of the appliance in the form intended, for instance, for use by teacher, the cover or lid being shown open and extended.

Figure 2 is a perspective view corresponding to Figure 1 of the appliance closed.

Figures 3 and 4 are views respectively similar to Figures 1 and 2, but on a smaller scale of the appliance as intended, for instance, for use by the pupils.

As illustrated in the accompanying drawings the apparatus consists of a box or receptacle 1 of any convenient size and shape, preferably rectangular and of any suitable material such as wood, metal, fibre or composition, conveniently partitioned by transverse members 6 and 7 forming smaller receptacles for the reception of the blanks, as stencils which may be of any suitable material such as metal, celluloid, cardboard or paper. A cover or lid 2 is attached to the box 1 by hinges 4 and adapted to be secured in the open position by sliding bolts or the like.

The lid 2 has an extension 3 attached to the near edge by sliding bolts or the like of the same type as 5 and adapted to keep the extension in the open position and in a definite plane relative to the plane of the box. A number of bars 8 are secured in any convenient manner to the inner face of the lid and/or its extension. The said bars have their edges rabbeted or otherwise formed with grooves to receive the lower edges of the blanks as stencils, and hold the same detachably in place. Other suitable means for this purpose may be employed.

The stencilled letters of alphabet may be applied on the surface of the lid or cover to render the letters easily visible, for practice in touch, reading and rudiments of writing.

Suitable fastening devices 9 are secured to the edges of the box or receptacle adapted to engage corresponding catches on the upper edge or lid of the cover 2. A suitable handle 10 may conveniently be provided. The cover or lid of the box may have secured to its surface a pivoted member 11 adapted to support the teacher's box when it is hung for example from a wall or a tree; and to maintain the lid of the pupil's box at any obtuse angle when the box has no lid extensions as represented in Figures 3 and 4, the lid having a metal support. The inner surface of the lid or the extensions thereof may be lined with slate or the like so that letters or figures may be traced thereon through the stencils by means of chalk or white crayon, or by pencil on sheets of paper.

Having now particularly described and ascertained the nature of my said invention and in what manner the same is to be performed, I declare that what I claim is:—

An educational appliance comprising a box having compartments for the reception of stencil characters, a lid hinged to the box, means to secure the lid and support the same when the lid is in open position, an extension member hinged to the free edge of the lid, means to secure the extension member to the lid and hold the same in the common plane of the lid when the lid is in open position, individual letter and numeral rectangular stencils, each of a size and shape adapted to fit in one of the compartments of the box, each having a single letter or numeral character, and longitudinally arranged bars on the lid and the extension member, spaced apart and adapted each to receive character stencils thereon and permit the arrangement of the stencils to form words and numbers and display such formed words and numbers.

In witness whereof I affix my signature.

MANUEL ANTUNES AMOR.